United States Patent
Meyer

[15] 3,659,320
[45] May 2, 1972

[54] FASTENER ASSEMBLY

[72] Inventor: Engelbert A. Meyer, Union Lake, Mich.

[73] Assignee: USM Corporation, Warren Division, Mount Clemens, Mich.

[22] Filed: July 9, 1971

[21] Appl. No.: 161,142

[52] U.S. Cl. ............................................... 24/73 HS, 85/82
[51] Int. Cl. ....................................... F16b 5/12, F16b 13/04
[58] Field of Search ............................. 24/73 HS; 85/5 R, 82

[56] References Cited

UNITED STATES PATENTS

| | | | |
|---|---|---|---|
| 2,706,656 | 4/1955 | Roubal | 24/73 HS UX |
| 2,894,426 | 7/1959 | Rapata | 85/82 UX |
| 3,063,114 | 11/1962 | Perrochat | 24/73 HS |
| 3,200,694 | 8/1965 | Rapata | 85/82 |
| 3,205,760 | 9/1965 | Seckerson et al. | 85/82 |
| 3,395,604 | 8/1968 | Williams | 85/82 |

FOREIGN PATENTS OR APPLICATIONS 898,566  6/1962  Great Britain .......................... 85/5 R Primary Examiner—Donald A. Griffin

[57] ABSTRACT

A fastener assembly for securing an emblem, medallion or the like provided with a plurality of projecting pins to a panel member having a plurality of apertures therethrough corresponding in number and spacing to said pins, with a plastic grommet disposed in each aperture, each grommet having a reduced internal diameter portion, whereby upon insertion of the pin, the grommet walls will expand into sealing engagement about the panel aperture and also tightly frictionally engage the pin surface to retain the emblem against the panel. The grommet may be additionally provided with a pair of radially projecting protuberances which are resiliently deformable upon insertion of the grommet through the panel aperture, and serve to retain the grommet therein prior to assembly of the emblem or medallion.

5 Claims, 5 Drawing Figures

PATENTED MAY 2 1972

3,659,320

INVENTOR
ENGELBERT A. MEYER
BY
Burton & Parker
ATTORNEYS 3,659,320

FASTENER ASSEMBLY

BACKGROUND OF THE INVENTION

The present invention relates generally to fastening devices, and more particularly to fasteners utilized to secure a structural member to an apertured panel, a typical example being the securement of decorative emblems, medallions, nameplates and the like to automobile body panels. One of the problems in providing fastening devices for these applications has been one of insuring that at least the peripheral edge of the member is retained tightly in contact with the panel surface. In the securement of hollow metal moldings and the like to panel surfaces, there is sufficient clearance under the molding to position any number of a variety of fastener shapes and sizes upstanding from the panel which are covered by the hollow molding. In the case of relatively shallow, flat medallions, nameplates and the like, there is insufficient space to contain a relatively large fastening element. Various types of metal fasteners have been utilized for this purpose, but these have presented problems of corrosion and rusting because of the metal-to-metal contact between the fastener and the panel, which problems have only partially been solved by attempting to seal the aperture with a mastic or rubber compound.

In addition, the metal fasteners employed have been of complex configuration, requiring expensive tooling in their manufacture. Very recently, attempts have been made to provide a non-metallic fastener assembly for securing a structural member to an apertured panel, such prior art being exemplified by U.S. Pat. Nos. 3,063,114; 3,200,694 and 3,395,604.

One outstanding feature of the fastener disclosed herein is that the plastic grommet, when inserted in the panel aperture, is capable of limited lateral movement to accommodate manufacturing tolerances in the spacing of the panel apertures and/or the spacing of the pins on the structural member. Another feature is that, during the assembly of the elements together, the particular configuration of the grommet causes expansion thereof upon insertion of a pin to completely seal against the marginal edges of the aperture on both sides of the panel. Thus, manufacturing variances in the parts to be assembled can be tolerated, while at the same time insuring that the completed assembly will be secure and water-tight.

It has been found that plastic materials such as Nylon or Lexan, trademark of General Electric Company, possess the requisite resiliency for the grommet, and also exhibit the best co-efficient of friction to securely retain the pins within the grommets.

In order to enable a clear understanding of the invention, one embodiment is hereinafter described and is illustrated in the accompanying drawing wherein.

Figure 1:
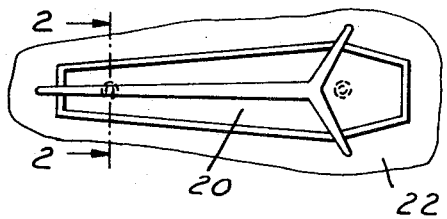
FIG. 1 is a plan view of a medallion or like structural member secured to a panel or the like by a fastening device embodying the invention.

Referring now more particularly to the drawings, there is shown a structural member such as a medallion or the like 20 secured to a panel partially shown at 22, the medallion 20 being provided with a plurality, in this case two, projecting pins 24 which extend through corresponding apertures 26 in the panel. Disposed in each of the panel apertures and adapted to frictionally engage and grip the pin 24 is a plastic grommet 28. Each pin 24 is provided with a tapered, rounded nose portion 30 as shown to facilitate insertion thereof into the grommet 28.

Figure 5:
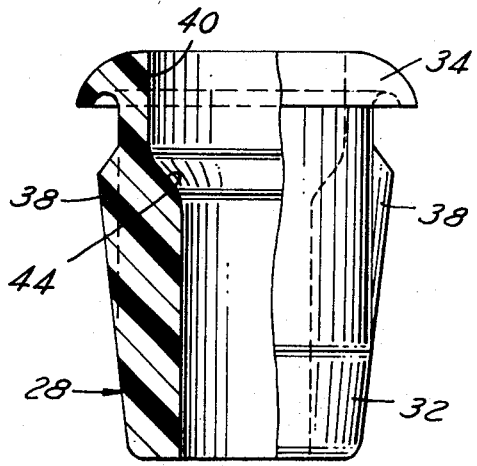
FIG. 5 is a side elevation, partly in section, of the plastic grommet shown in FIGS. 2–4.
Figure 3:
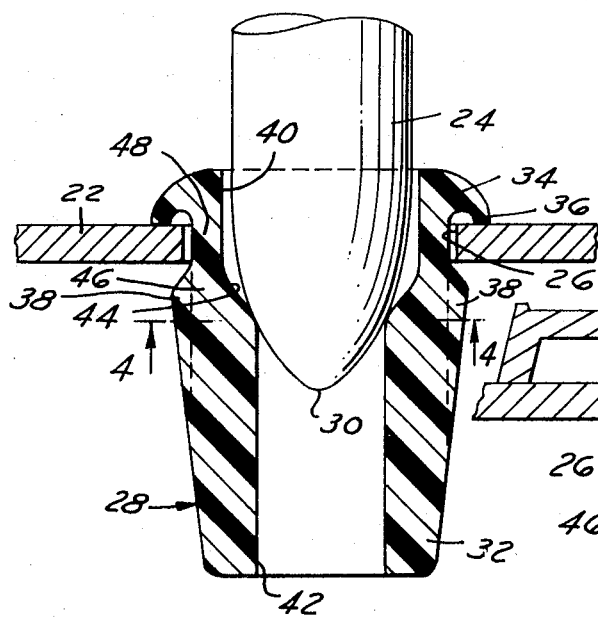
FIG. 3 is a cross-sectional view similar to FIG. 2 showing the parts thereof partially assembled.

As stated above, the grommet 28 is preferably made of a relatively hard, yet resistingly deformable plastic material such as Nylon or the like which may be easily and inexpensively formed by conventional molding processes. The grommet comprises a generally cylindrical body portion 32 and a head portion 34. As shown in FIGS. 3 and 5, the end of the body portion 32 opposite head 34 may taper inwardly slightly to facilitate its insertion through the panel aperture. Head portion 34 defines a peripheral flange 36 which in its normal unextended position extends generally outwardly and downwardly, and is relatively thin in cross section, as can be seen from an examination of FIGS. 3 and 5. The outer diameter of the grommet body portion 32 is somewhat less than the diameter of the panel aperture 26, so that upon initial insertion of the grommet within the aperture, some free lateral movement of the grommet is permitted. Spaced below the head 34 a distance equal to or greater than the thickness of panel 22, the grommet body 32 may have an oppositely disposed pair of radially extending wings or protuberances 38, the distance between the outer surfaces of which is greater than the diameter of the panel aperture 26. The wings 38 are sufficiently resiliently deformable to permit insertion of the grommet 28 through the aperture 26, and when fully assembled as shown in FIG. 3, the wings insure against accidental dislodgment of the grommet from the aperture prior to the assembly of the medallion 20 with its pins 24.

Internally, the grommet 28 exhibits a stepped bore, comprising a larger portion 40 adjacent the head 34, and a reduced diameter portion 42 spaced from the head. The transitional portion of the stepped bore joining the diameters 40 and 42 is preferably a smoothly tapered surface 44 having smooth radii at opposite ends thereof as shown in FIG. 3. The enlarged bore 40 is of a greater diameter than the pin 24, while the bore 42 is of lesser diameter than the pin. The large bore 40 facilitates insertion of the pin 24, and it will be obvious from a consideration of FIG. 3, if the pin 24 and aperture 26 are out of alignment, the clearance between the aperture and the outer diameter of the grommet shank, together with the oversized entrance bore 40, will still enable the pin to be inserted within the grommet. The enlarged bore portion 40 is of such a length so that its inner end lies substantially radially opposite the lower surface of panel 22, or slightly therebelow.

To assemble the emblem 20 to the panel 22, a grommet 28 is first axially inserted into each panel aperture 26, assuming the general orientation therein illustrated in FIG. 3. The emblem 20 with its plurality of pins 24 projecting laterally therefrom is then positioned in place with each pin projecting freely into the enlarged grommet bore 40, and as above recited, slight misalignment of pin 24 with respect to aperture 26 will be accommodated by the adjustability feature of grommet 28. The assembly is completed by urging the medallion 20 toward the panel, which as can be seen from the drawing, will force the pins 24 into the reduced grommet bore 42, thereby expanding the grommet.

Figure 2:
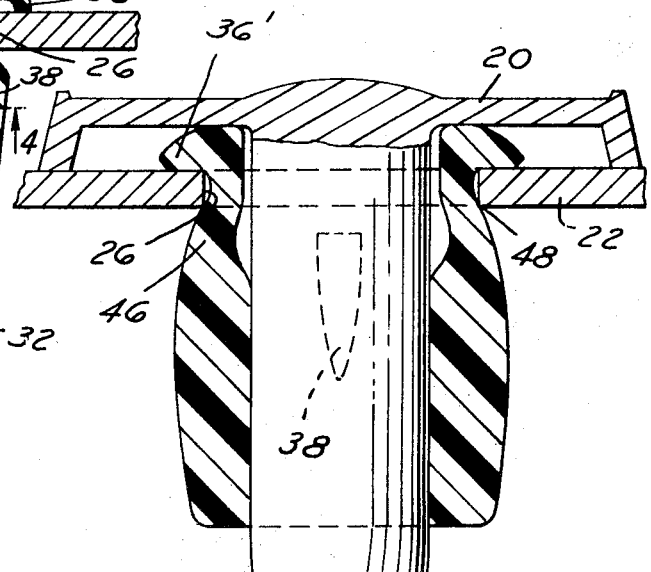
FIG. 2 is a cross-sectional view taken along line 2—2 of FIG. 1.
Figure 4:
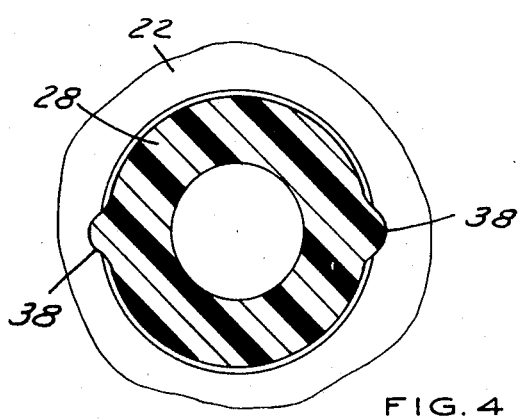
FIG. 4 is a cross-sectional view taken along line 4—4 of FIG. 3.

As the pin is forced into the grommet, the thin peripheral edge 36 of grommet head 34 will be resiliently deformed radially outwardly until it assumes the position indicated at 36' in FIG. 2 in sealing engagement with the marginal edge of the panel aperture 26. Substantially simultaneously, the pin 24 enters the bore 42, causing radial expansion of the grommet body walls, and also causing the portion of the grommet wall indicated at 46 to effectively shift axially toward the panel surface until, upon complete insertion of the pin 24, the grommet assumes the position shown in FIG. 2. Because of the particular configuration of the grommet bore, insertion of the pin 24 in effect causes the wall portion 46 of the grommet to pivot radially outwardly and upwardly toward the head 34, which movement is permitted by the fact that the wall portion 48 in the area of enlarged bore 40 is is thinner than the remaining wall portion of the grommet. Thus, upon complete assembly of the parts shown, the grommet has expanded to the position shown in FIG. 2 whereat the head flange 36' is in sealing engagement with the aperture marginal edge on one side of the panel 22, while the grommet body has expanded radially and been displaced axially to seal the marginal edge of the aperture on the opposite side of the panel.

The frictional engagement of the expanded grommet with the surface of the pin 24 provides a tight grip preventing the pin from being withdrawn from the grommet. It has been found with the materials above indicated for the grommet, a force of at least 35 to 40 pounds is necessary to withdraw the pin 24 from the grommet 28 once the parts have been fully assembled. It is of course preferable that the pin be of such a length that its portion having the largest diameter will extend completely through and beyond the grommet in its assembled position, as this will provide the greatest surface contact and the largest frictional retaining force possible.

What is claimed is:

1. A fastener assembly for securing a member in overlying relation to the surface of a panel having a plurality of spaced circular apertures therethrough, comprising: a plurality of cylindrical studs fixed to said member and corresponding in number and spacing to said panel apertures and extending therethrough with each stud having a tapered nose; a resistingly deformable, plastic grommet in each aperture having a flange at one end overlying the surface of the panel beneath said member and adjacent the aperture and having a shank portion extending through the aperture and beyond the opposite surface of the panel, each grommet provided with a stepped bore having a first cylindrical bore portion opening outwardly through said one end and terminating inwardly from such end at a point substantially radially opposite the edge of the aperture at said opposite surface of the panel with such bore portion having a diameter greater than said stud for limited lateral adjustment in any direction between the stud and grommet within such first bore portion, said stepped bore having a second bore portion opening outwardly through the end of the grommet shank and extending axially inwardly along the shank toward said first bore portion and having a diameter less than the diameter of the stud to tightly grip the same when the stud is telescoped therethrough, said stepped bore having a third bore portion smoothly tapering between and connecting said first and second bore portions, said shank of the grommet being radially expansible upon telescoping the stud through said second bore portion to swell the exterior of the shank into fluid-tight sealed relation with the edge of the panel aperture at said opposite surface of the panel and draw said flange into fluid-tight sealed relation with the other side of the panel, and that portion of said grommet shank lying beyond said opposite surface of the panel being resistingly laterally displaceable to accommodate limited lateral adjustment between the grommet and stud within said first bore portion.

2. A fastener assembly as defined in claim 1 characterized in that each of said grommet shanks has at least two integral, resilient, radially outwardly projecting protuberances spaced from said flange a distance greater than the panel thickness for retaining said grommet within said aperture prior to insertion of a stud within the grommet.

3. A fastener assembly as defined in claim 1 characterized in that each of said studs has a tapered distal end portion terminating in a rounded nose for insertion within a respective grommet bore.

4. A fastener assembly as defined in claim 1 characterized in that said third bore portion includes a smooth radius at its juncture with the second bore portion.

5. A fastener assembly as defined in claim 1 characterized in that said grommet flange extends radially outwardly and downwardly toward the shank end, terminating in a relatively thin peripheral edge spaced radially beyond the panel aperture to sealingly abut the panel surface upon assembly of the grommet shank through the panel aperture and insertion of the stud within the grommet bore.

* * * * *